United States Patent Office 2,858,311
Patented Oct. 28, 1958

2,858,311

3,6 - BIS(TERTIARY - AMINO - ALIPHATIC) SUBSTITUTED PYRIDAZINES, AND THEIR PREPARATION

Edgar Alfred Steck, Albany, N. Y., assignor to Sterling Drug Inc., New York, N. Y., a corporation of Delaware No Drawing. Application August 31, 1955
Serial No. 531,836

30 Claims. (Cl. 260—250)

This invention relates to new and useful compounds, 3,6-bis(tertiary-amino-aliphatic) substituted pyridazines and salts thereof, to intermediates thereof, and to their preparation. In particular the invention relates to compounds having the formula

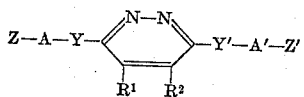

wherein Z and Z' represent basic tertiary-amino radicals, A and A' represent lower-alkylene radicals or oxygen interrupted lower-alkylene radicals, Y represents O, S or NH, Y' represents O or S, and $R^1$ and $R^2$ represent hydrogen or lower-alkyl radicals.

This application is a continuation-in-part of my co-pending application, Serial No. 359,230, filed June 2, 1953, now abandoned.

My new compounds possess valuable pharmacological properties and in particular are useful as curarimimetic agents. The quaternary ammonium salts are particularly valuable for this purpose, although the free bases and acid-addition salts also possess curarimimetic action but larger doses are required than for the quaternary ammonium salts.

In the above general formula, the terms Z and Z' as tertiary-amino radicals include di-lower-alkylamino and saturated heterocyclic groups, such as 1-piperidyl, N-methyl-2-piperidyl, N-methyl-3-piperidyl, N-methyl-4-piperidyl, 1-pyrrolidyl, N-methyl-2-pyrrolidyl, 4-morpholinyl, N-methyl-3-morpholinyl, 4-methyl-1-piperazinyl, 1,4-dimethyl-2-piperazinyl, 2-methyl-1-piperidyl, 2,3-dimethyl-1-pyrrolidyl, 2,4-dimethyl-1-piperazinyl, and the like. The preferred class of saturated heterocyclic groups thus includes piperidyl, pyrrolidyl, morpholinyl, piperazinyl, and lower-alkylated derivatives thereof. In the lower-alkylated heterocyclic groups, there can be from one to about three alkyl substituents having from one to about four carbon atoms. The alkyl groups can be attached to carbon or nitrogen.

In the di-lower-alkylamino radicals the term, lower-alkyl, includes alkyl radicals containing from one to about six carbon atoms, and the lower-alkyl groups can be the same or different. Thus Z and Z', when they represent di-lower-alkylamino radicals, include such groups as dimethylamino, diethylamino, ethylmethylamino, dipropylamino, dibutylamino, dipentylamino, and dihexylamino.

The symbols A and A' represent lower-alkylene radicals or oxygen interrupted lower-alkylene radicals in which the free valences are on different carbon atoms. In other words, the radicals Z and Y (Z' and Y') are separated by at least two carbon atoms. The radicals A and A' must perforce contain at least two carbon atoms, and can contain as many as about six carbon atoms. The lower-alkylene radicals are straight or branched and include such radicals as ethylene, —$CH_2CH_2$—; 1,3-propylene, —$CH_2CH_2CH_2$—; 1,2-propylene,

1,4-butylene, —$CH_2CH_2CH_2CH_2$—; 1,5-pentylene,

1,6-hexylene, —$CH_2CH_2CH_2CH_2CH_2CH_2$—; 1,2-dimethylethylene, —$CH(CH_3)CH(CH_3)$; and oxygen interrupted groupings such as —$CH_2CH_2OCH_2CH_2$—,

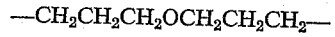

and the like.

The pyridazine nucleus is optionally substituted in positions 4 and 5 by lower-alkyl groups ($R^1$ and $R^2$), having from one to about four carbon atoms, thus including such groups as methyl, ethyl, propyl, isopropyl, butyl and isobutyl.

My new compounds are prepared from the appropriate 3,6-dihalopyridazine having the general formula

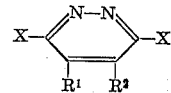

wherein $R^1$ and $R^2$ are hydrogen or lower-alkyl radicals and X is halogen, preferably middle halogen having an atomic weight between 35 and 80, including chlorine and bromine. The halogen atoms are replaced by the substituents, Z—A—Y— and —Y'—A'—Z', having the meanings given above, by causing the 3,6-dihalopyridazine to react with an alkali metal derivative of a tertiary-amino alcohol or mercaptan, Z—A—OM or Z—A—SM, where M is an alkali metal, preferably sodium or potassium, under anhydrous conditions; or with a tertiary-amino substituted primary amine, Z—A—$NH_2$. The halogen atoms of the 3,6-dihalopyridazine are not replaced simultaneously, but rather in a stepwise manner, one halogen being essentially completely replaced before the other is attacked. For this reason it is possible under controlled conditions to isolate the intermediate in which only one halogen atom of the 3,6-dihalopyridazine has been replaced with a substituent, Z—A—Y—, viz.:

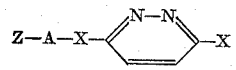

This intermediate can then be caused to react with an alkali metal tertiary-amino alkoxide or mercaptide, to introduce the substituent —Y'—A'—Z', which can thus be the same as or different from the first substituent, Z—A—Y—. It has not been found possible to replace both halogen atoms by a tertiary-aminoalkylamino radical (both Y and Y' being NH).

In the reaction between the dihalopyridazine and the alkali metal tertiary-amino alkoxide or mercaptide, the use of a lower temperature, e. g., between about 50 and 100° C., and a lesser quantity of alkoxide or mercaptan, e. g., about one mole per mole of pyridazine, will favor the formation of the intermediate 3-halo-6-(tertiary-amino-aliphatic) pyridazine; whereas the use of a higher temperature, e. g., between about 100 and 150° C., a longer time of heating, and an excess of alkoxide or mercaptan, more than about two moles per mole of pyridazine, will favor the formation of the 3,6-bis(tertiary-amino-aliphatic)-pyridazine. Sometimes mixtures of the mono- and di-substituted products are obtained, the relative amounts depending not only upon the reaction conditions and relative amounts of starting materials, but also upon the nature of the substituents in the reactants. These mixtures can be readily separated by fractional distillation.

The reaction of the 3,6-dihalopyridazine with an alkali metal derivative of a tertiary-amino alcohol or mercaptan, used when Y and/or Y' are O or S, is carried out by adding the 3,6-dihalopyridazine to a solution of the alkali metal derivative of the tertiary-amino alcohol or mercaptan in an inert anhydrous solvent, and heating the reaction mixture. Exemplary of the tertiary-amino alcohols or mercaptans which can be used are 2-diethylaminoethanol, $(C_2H_5)_2NCH_2CH_2OH$; 3-dimethylaminopropanol, $(CH_3)_2NCH_2CH_2CH_2OH$; 2-dipropylaminopropanol, $(C_3H_7)_2NCH(CH_3)CH_2OH$; 4 - (1 - piperidyl)butanol, $C_5H_{10}NCH_2CH_2CH_2CH_2OH$; 2 - (2 - dimethylaminoethoxy)ethanol, $(CH_3)_2NCH_2CH_2OCH_2CH_2OH$; 2-dibutylaminoethanethiol, $(C_4H_9)_2NCH_2CH_2SH$; 5 - (1 - pyrrolidyl)pentanethiol, $C_4H_8NCH_2CH_2CH_2CH_2CH_2SH$; 2-[2-(4-morpholinyl)ethoxy]ethanethiol, $$OC_4H_8NCH_2CH_2OCH_2CH_2SH$$

and the like.

The reaction of the 3,6-dihalopyridazine with a tertiary-amino substituted primary amine to produce a 3-halo-6-tertiary-aminoalkylaminopyridazine, used when Y is NH, is carried out by heating the reactants either alone or in aqueous acid medium. When the reactants are heated alone, an excess of amine is used to take up the hydrogen halide formed in the reaction. When an aqueous medium is used, the reaction mixture can also contain a water-miscible organic solvent to dissolve at least in part the water-insoluble dihalopyridazine and thus facilitate the reaction. Exemplary of the tertiary-amino substituted primary amines which can be used are 2-diethylaminoethylamine, $(C_2H_5)_2NCH_2CH_2NH_2$; 3-dimethylaminopropylamine, $(CH_3)_2NCH_2CH_2CH_2NH_2$; 2-(1-piperidyl)-propylamine, $C_5H_{10}NCH(CH_3)CH_2NH_2$; 2-(2-diethylaminoethoxy)-ethylamine, $$(C_2H_5)_2NCH_2CH_2OCH_2CH_2NH_2$$

5-(1-pyrrolidyl)-pentylamine, $$C_4H_8NCH_2CH_2CH_2CH_2CH_2NH_2$$

and the like.

The new bis(tertiary-amino-aliphatic) substituted pyridazines are most conveniently used in the form of water-soluble, non-toxic acid-addition or quaternary ammonium salts, and these salts are within the purview of the invention. The acids which can be used to prepare acid-addition salts are those which produce when combined with the free bases, salts whose anions are relatively innocuous to the animal organism in therapeutic doses of the salts, so that beneficial physiological properties inherent in the free bases are not vitiated by side-effects ascribable to the anions. Appropriate acid-addition salts are those derived from mineral acids such as hydrochloric acid, hydrobromic acid, hydriodic acid, nitric acid, sulfuric acid and phosphoric acid; and organic acids such as acetic acid, citric acid, lactic acid, and tartaric acid. The quaternary ammonium salts are obtained by the addition of alkyl, alkenyl or aralkyl esters of inorganic acids or organic sulfonic acids to the free base form of the compounds. The alkyl, alkenyl or aralkyl esters so used include such compounds as methyl chloride, methyl bromide, methyl iodide, ethyl bromide, propyl chloride, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution. If one equivalent of acid is used a mono-acid-addition salt is obtained. If two or more equivalents of acid are used a poly-acid-addition salt is obtained, depending upon the number of basic nitrogen atoms in the molecule.

The quaternary ammonium salts are prepared by mixing the free base and the alkyl or aralkyl ester in an organic solvent. Heating may be used to facilitate the reaction. The quaternary ammonium salt separates directly or can be obtained by concentration of the solution. If one mole of alkyl or aralkyl ester per mole of base is used a mono-quaternary ammonium salt is obtained. If two or more moles of ester per mole of base are used a poly-quaternary ammonium salt is obtained, the number of quaternized centers depending upon the number of basic nitrogen atoms present in the free base and the number of equivalents of ester used.

The following examples will further illustrate the invention.

INTERMEDIATES (a) *3,6-dichloropyridazine.*—Maleic hydrazide was refluxed with an excess of phosphorus oxychloride, and the mixture was hydrolyzed in ice water after removal of most of the excess phosphorus oxychloride in vacuo. The aqueous mixture was rendered alkaline with concentrated ammonium hydroxide, and the resulting solid product was collected by filtration giving an 82% yield of 3,6-dichloropyridazine, which could be purified by distillation (B. P. 89–91° C. at 0.2 mm.), steam distillation, sublimation in vacuo, or recrystallization from hexane, giving a product melting at 69–70° C.

(b) *3,6-dibromopyridazine.*—A mixture of 23.0 g. (0.2 mole) of maleic hydrazide and 400 cc. of molten phosphorus oxybromide was refluxed with stirring for two and one-half hours. The viscous reaction mixture was concentrated in vacuo and hydrolyzed with ice water. The aqueous mixture was made basic with ammonium hydroxide, and the resulting solid product (33.0 g.) was collected by filtration. The product was sublimed at 150° C. (0.5 mm.), recrystallized three times from methanol and then resublimed, giving 13.1 g. of 3,6-dibromopyridazine, colorless blades, M. P. 115–116° C.

*Analysis.*—Calcd. for $C_4H_2Br_2N_2$: Br, 67.18; N, 11.78. Found: Br, 67.32; N, 11.47.

The mother liquors from the recrystallizations from methanol were concentrated and the residue was recrystallized several times from benzene and from a mixture of methanol and acetone, giving 1.65 g. of 6-bromo-3-pyridazone, colorless needles, M. P. 158–160° C.

*Analysis.*—Calcd. for $C_4H_3BrN_2O$: C, 27.45; H, 1.73; N, 16.01. Found: C, 27.67; H, 1.51; N, 16.13.

(c) *3,6 - dichloro - 4-methylpyridazine.*—Methylmaleic anhydride (citraconic anhydride) (22.4 g., 0.2 mole) was added to a solution of 26.0 g. (0.2 mole) of hydrazine sulfate in 30 cc. of water, and the stirred mixture was refluxed for four hours, using a partial take-off arrangement for the removal of water in order to gradually concentrate the reaction mixture and insure completion of the reaction. The mixture was then diluted with 150 cc. of water, and the solid product was collected by filtration and dried, giving 19.0 g. of methylmaleic hydrazide, M. P. 278–280° C. After two recrystallizations from diethylene glycol monomethyl ether, a sample melting at 283–285° C. was obtained.

*Analysis.*—Calcd. for $C_5H_6N_2O_2$: C, 47.61; H, 4.80; N, 22.22. Found: C, 47.69; H, 4.70; N, 22.84.

A mixture of 360 g. (2.76 mole) of methylmaleic hydrazide and 2.4 liters of phosphorus oxychloride was refluxed with stirring for three hours. After removal of the excess phosphorus oxychloride in vacuo, the residue was hydrolyzed in ice water and the mixture made basic with ammonium hydroxide. The solid product (424.0 g.) was collected by filtration, dried and distilled at 110–112° C. (1 mm.), giving 387.1 g. of 3,6-dichloro-4-methylpyridazine, M. P. 86–88° C. Recrystallization from water gave a sample melting at 87–88° C.

*Analysis.*—Calcd. for $C_5H_4Cl_2N_2$: C, 36.84; H, 2.47;

Cl, 43.50; N, 17.19. Found: C, 36.95; H, 2.75; Cl, 43.6; N, 16.77.

(d) *3,6 - dichloro - 4,5-dimethylpyridazine.*—Dimethylmaleic anhydride (55.0 g., 0.435 mole) was added to a solution of 56.5 g. (0.435 mole) of hydrazine sulfate in 150 cc. of water, and the mixture was refluxed for three and one-half hours, with provision for slow removal of water from the reaction mixture. Water (100 cc.) was then added to the mixture, and the solid product was collected by filtration and recrystallized from diethylene glycol monomethyl ether, giving 30.0 g. of dimethylmaleic hydrazide (pyrocinchonic hydrazide), colorless needles, M. P. above 325° C.

*Analysis.*—Calcd. for $C_6H_8N_2O_2$: C, 51.42; H, 5.75; N, 19.99. Found: C, 51.20; H, 6.06; N, 20.09.

The mother liquors from the recrystallization of dimethylmaleic hydrazide were diluted with water, and the resulting solid which separated was collected by filtration and recrystallized first from diethylene glycol monomethyl ether and then from diethylene glycol monomethyl ether, giving 10.1 g. of bis(dimethylmaleic) hydrazide, colorless needles, M. P. 238–240° C.

*Analysis.*—Calcd. for $C_{12}H_{12}N_2O_4$: C, 58.06; H, 4.87; N, 11.29. Found: C, 57.86; H, 4.80; N, 11.56.

A mixture of 23.8 g. (0.17 mole) of dimethylmaleic hydrazide and 230 cc. of phosphorus oxychloride was refluxed with stirring for three hours. The excess phosphorus oxychloride was removed in vacuo, and the residue hydrolyzed in ice water and made basic with ammonium hydroxide. The crude solid product (28.5 g.) was collected by filtration, sublimed at 120–140° C. (0.3 mm.) and recrystallized from methanol, giving 23 g. of 3,6-dichloro-4,5-dimethylpyridazine, colorless needles, M. P. 120–121° C.

*Analysis.*—Calcd. for $C_6H_6Cl_2N_2$: C, 40.70; H, 3.42; N, 15.83. Found: C, 40.63; H, 3.44; N, 15.88.

Example 1

*3,6-bis(2-dimethylaminoethoxy)pyridazine.*—A refluxing suspension of 4.7 g. (0.2 mole) of finely divided sodium metal in 200 cc. of xylene was stirred violently while 19.1 g. (0.21 mole) of 2-dimethylaminoethanol, dissolved in 100 cc. of xylene, was added. The mixture was refluxed for one hour, and the clear, yellowish solution thus obtained, containing sodium 2-dimethylaminoethoxide, was treated with 14.9 g. (0.1 mole) of 3,6-dichloropyridazine dissolved in 100 cc. of xylene. The reaction mixture was refluxed with stirring for ten hours, cooled, and the basic material was extracted with concentrated hydrochloric acid. The aqueous extracts were concentrated to a small volume in vacuo and made strongly basic with 50% sodium hydroxide solution. The solution was extracted with methylene chloride, and the product was fractionated giving 16.4 g. of 3,6-bis(2-dimethylaminoethoxy)pyridazine, B. P. 130–133° C. (0.4 mm.), $n_D^{25}=1.4982$.

*Analysis.*—Calcd. for $C_{12}H_{22}N_4O_2$: C, 56.67; H, 8.72; N, 22.03. Found: C, 56.75; H, 8.71; N, 22.08.

The bismethiodide of 3,6-bis(2-dimethylaminoethoxy)pyridazine was obtained by warming a solution of 10.5 g. of the free base and 12.5 g. of methyl iodide in 30 cc. of methanol. The bismethiodide was collected by filtration and recrystallized from a methanol-ether mixture, giving 19.8 g. of colorless prismatic needles, M. P. 241–242° C. (dec.).

*Analysis.*—Calcd. for $C_{14}H_{28}I_2N_4O_2$: N, 10.41; I, 47.16. Found: N, 10.38; I, 46.7.

The curare-like activity of 3,6-bis(2-dimethylaminoethoxy)pyridazine bismethiodide was measured by subcutaneous injection in mice by the inclined screen method [Hoppe, J. Pharmacol. Exptl. Therap. 100, 333 (1950)]. The effective dose in 50% of the animals ($ED_{50}$) was found to be 16±1 mg. per kg. of body weight. The intravenous toxicity in mice, $LD_{50}$ (dose lethal to 50% of the animals), was 28±1.4 mg. per kg. of body weight.

Example 2

3,6-bis(2-diethylaminoethoxy)pyridazine was obtained from the reaction of 3,6-dichloropyridazine with sodium 2-dimethylaminoethoxide using the manipulative procedure described in Example 1. The 3,6-bis(2-diethylaminoethoxy)pyridazine was obtained in 70.5% yield as a yellow oil, B. P. 132–137° C. (0.2 mm.), $n_D^{25}=1.4906$.

*Analysis.*—Calcd. for $C_{16}H_{30}N_4O_2$: C, 69.91; H, 9.74; N, 18.05. Found: C, 62.18; H, 9.68; N, 18.02.

The dipicrate of 3,6-bis(2-diethylaminoethoxy)pyridazine was prepared by reacting the free base with picric acid in methanol solution, and the product was recrystallized from acetone, giving yellow needles, M. P. 158–158.5° C.

*Analysis.*—Calcd. for $C_{16}H_{30}N_4O_2 \cdot 2C_6H_3N_3O_7$: C, 43.76; H, 4.72; N, 18.23. Found: C, 43.91; H, 4.49; N, 18.54.

The bismethiodide of 3,6-bis(2-diethylaminoethoxy)pyridazine was prepared by warming the free base with an excess of methyl iodide in methanol solution, and was recrystallized from a methanol-ether solution as colorless prismatic needles, M. P. 229–229.5° C. (dec.).

*Analysis.*—Calcd. for $C_{18}H_{36}I_2N_4O_2$: C, 36.38; H, 6.10; N, 9.43; I, 42.71. Found: C, 36.68; H, 6.14; N, 9.34; I, 42.60.

The curare-like activity of 3,6-bis(2-diethylaminoethoxy)pyridazine bismethiodide was measured in mice by the inclined screen method. An $ED_{50}$ value of 3.3±0.3 mg./kg. was found. The intravenous toxicity $LD_{50}$ value in mice was 5.9±0.5 mg./kg.

Example 3

3,6-bis(2-diethylaminoethoxy)-4-methylpyridazine was prepared from 3,6-dichloro-4-methylpyridazine and sodium 2-diethylaminoethoxide using the manipulative procedure described above in Example 1. The 3,6-bis(2-diethylaminoethoxy)-4-methylpyridazine was obtained in 84% yield as a yellow liquid, B. P. about 140° C. ($3 \times 10^{-5}$ mm.), $n_D^{25}=1.4911$.

*Analysis.*—Calcd. for $C_{17}H_{32}N_4O_2$: C, 62.93; H, 9.94; N, 17.27. Found: C, 62.98; H, 10.09; N, 17.50.

The bismethobromide salt of 3,6-bis(2-diethylaminoethoxy)-4-methylpyridazine was obtained in the form of colorless microcrystals, M. P. about 145° C., when recrystallized from a methanol-acetone mixture.

*Analysis.*—Calcd. for $C_{19}H_{38}Br_2N_4O_2$: C, 44.36; H, 7.45; Br, 31.08. Found: C, 44.51; H, 7.33; Br, 30.98.

The curare-like activity of 3,6-bis(2-diethylaminoethoxy)-4-methylpyridazine bismethobromide was measured in mice by the inclined screen procedure, and an $ED_{50}$ value of 0.8±0.1 mg./kg. was found. The intravenous toxicity $LD_{50}$ value in mice was 1.8±0.15 mg./kg.

Example 4

3,6-bis(2-dibutylaminoethoxy)pyridazine was prepared from 3,6-dichloropyridazine and sodium 2-dibutylaminoethoxide using the manipulative procedure described above in Example 1. The 3,6-bis(2-dibutylaminoethoxy)pyridazine was obtained in 81% yield as a yellow oil, B. P. 192–195° C. (0.15 mm.), $n_D^{25}=1.4853$.

*Analysis.*—Calcd. for $C_{24}H_{46}N_4O_2$: C, 68.20; H, 10.97; N, 13.26. Found: C, 67.90; H, 11.25; N, 13.09.

The dinitrate of 3,6-bis(2-dibutylaminoethoxy)pyridazine was prepared from the free base and dilute nitric acid and was isolated by low temperature removal of the solvent in vacuo. The dinitrate was recrystallized from an ethanol-ether mixture in the form of colorless needles, M. P. 149.5–150.5° C.

*Analysis.*—Calcd. for $C_{24}H_{46}N_4O_2 \cdot 2HNO_3$: C, 52.53; H, 8.45; N, 15.32. Found: C, 52.50; H, 8.76; N, 15.45.

Example 5

3,6-bis(3-diethylaminopropoxy)pyridazine was prepared from 3,6-dichloropyridazine and sodium 3-diethylaminopropoxide in xylene using the manipulative procedure described above in Example 1. The 3,6-bis(3-diethylaminopropoxy)pyridazine was obtained in 70.5% yield, B. P. 130–132° C. (0.18 mm.), $n_D^{25}$=1.4888.

*Analysis.*—Calcd. for $C_{18}H_{34}N_4O_2$: C, 63.87; H, 10.13; N, 16.56. Found: C, 64.15; H, 10.32; N, 16.98.

The bismethiodide of 3,6-bis(3-diethylaminopropoxy)pyridazine was prepared by warming the free base with an excess of methyl iodide in methanol solution. When recrystallized from an ethanol-ether mixture the bismethiodide had the M. P. 186–187° C.

*Analysis.*—Calcd. for $C_{20}H_{40}I_2N_4O_2$: N, 9.00; I, 40.78. Found: N, 9.48; I, 40.3.

The curare-like activity of 3,6-bis(3-diethylaminopropoxy)pyridazine bismethiodide was measured in mice by the inclined screen procedure and in rabbits by the head-drop method, and $ED_{50}$ values of 0.3±0.02 and 0.2±0.014 mg./kg. respectively were found. This compound therefore has an activity approximately equal to that of d-tubocurarine. The intravenous toxicity $LD_{50}$ value in mice was 0.63±0.05 mg./kg.

The mono-(4-nitrobenzobromide) salt of 3,6-bis(3-diethylaminopropoxy)pyridazine was obtained in the form of colorless microcrystals, M. P. 181–182° C., when recrystallized from an isopropyl alcohol-ether mixture.

*Analysis.*—Calcd. for $C_{25}H_{40}BrN_5O_4$: Br, 14.30; N, 12.63. Found: Br, 13.95; N, 12.99.

The curare-like activity of 3,6-bis(3-diethylaminopropoxy)pyridazine mono-(4-nitrobenzobromide) was measured in mice by the inclined screen procedure, and an $ED_{50}$ value of 18.6±1.33 mg./kg. was found.

The bisethiodide salt of 3,6-bis(3-diethylaminopropoxy)pyridazine was obtained in the form of colorless microcrystals, M. P. 188–190° C. (dec.).

*Analysis.*—Calcd. for $C_{22}H_{44}I_2N_4O_2$: I, 39.0; N, 8.61. Found: I, 38.8; N, 8.84.

Example 6

3,6-bis(3-diethylaminopropoxy)-4-methylpyridazine was obtained from 3,6-dichloro-4-methylpyridazine and sodium 3-diethylaminopropoxide using the manipulative procedure described above in Example 1. The 3,6-bis(3-diethylaminopropoxy)-4-methylpyridazine was obtained in 80% yield as an amber oil, B. P. about 129–132° C. ($1\times10^{-4}$ mm.), $n_D^{25}$=1.4891.

*Analysis.*—Calcd. for $C_{19}H_{36}N_4O_2$: C, 64.73; H, 10.29; N, 15.89. Found: C, 64.99; H, 10.19; N, 15.77.

A bis-quaternary ammonium salt was obtained by warming 3,6-bis(3-diethylaminopropoxy)-4-methylpyridazine with 4-nitrobenzyl bromide in acetone solution. The bis(4-nitrobenzobromide) was collected by filtration and recrystallized from a methanol-acetone-ether mixture and obtained as pale yellow crystals, M. P. 188–189° C. (dec.)

*Analysis.*—Calcd. for $C_{33}H_{48}Br_2N_6O_6$: N, 10.71; Br, 20.37. Found: N, 10.39; Br, 20.18.

The curare-like activity of the bis(4-nitrobenzobromide) salt of 3,6-bis(3-diethylaminopropoxy)-4-methylpyridazine was measured in mice by the inclined screen procedure, and an $ED_{50}$ value of 0.26 mg./kg. was found.

Example 7

3,6-bis(4-diethylaminobutoxy)pyridazine was obtained from 3,6-dichloropyridazine and potassium 4-diethylaminobutoxide in xylene using the manipulative procedure described above in Example 1. The 3,6-bis(4-diethylaminobutoxy)pyridazine was obtained as a yellow oil, B. P. about 125° C. ($3\times10^{-5}$ mm.) $n_D^{25}$=1.4972.

*Analysis.*—Calcd. for $C_{20}H_{38}N_4O_2$: N, 15.29. Found: N, 15.58.

When sodium 4-diethylaminobutoxide was used in the preceding experiment instead of potassium 4-diethylaminobutoxide, the main product was that in which only one chlorine had been replaced by a 4-diethylaminobutoxy group, namely, 3-chloro-6-(4-diethylaminobutoxy)pyridazine, obtained as an amber oil, B. P. about 110° C. ($1\times10^{-5}$ mm.), $n_D^{25}$=1.5097.

The methobromide of 3-chloro-6-(4-diethylaminobutoxy)pyridazine was prepared by warming the free base with an excess of methyl bromide in methanol solution. The methobromide melted at 174–174.5° C. when recrystallized from an ethanol-ether mixture.

*Analysis.*—Calcd. for $C_{13}H_{23}BrClN_3O$: N, 11.91; Br, 22.66. Found: N, 11.80; Br, 22.72.

Example 8

3,6-bis(4-diethylamino-1-methylbutoxy)pyridazine was obtained from 3,6-dichloropyridazine and sodium or potassium 4-diethylamino-1-methylbutoxide using the manipulative procedure described above in Example 1. The 3,6-bis(4-diethylamino-1-methylbutoxy)pyridazine was obtained as an oil, B. P. about 150–156° C. ($2\times10^{-4}$ mm.), $n_D^{25}$=1.4870.

*Analysis.*—Calcd. for $C_{22}H_{42}N_4O_2$: C, 66.96; H, 10.73; N, 14.20. Found: C, 67.17; H, 10.64; N, 14.60.

Example 9

3,6-bis(5-diethylaminopentoxy)pyridazine was obtained from 3,6-dichloropyridazine and potassium 5-diethylaminopentoxide using the manipulative procedure described above in Example 1. Fractionation of the crude product gave two compounds, 3-chloro-6-(5-diethylaminopentoxy)pyridazine in 17% yield as a yellow oil, B. P. about 145° C. ($2\times10^{-4}$ mm.), $n_D^{25}$=1.4982; and 3,6-bis(5-diethylaminopentoxy)pyridazine in 34.5% yield as a yellow oil, B. P. about 165° C. ($3\times10^{-5}$ mm.), $n_D^{25}$=1.4896.

Example 10

3,6-bis[2-(4-morpholinyl)ethoxy]pyridazine was obtained by the reaction of 3,6-dichloropyridazine with sodium 2-(4-morpholinyl)-ethoxide in xylene using the manipulative procedure described above in Example 1. The free base was obtained in the form of a crystalline solid, and was recrystallized from a hexane-cyclohexane mixture, giving colorless blades, M. P. 85.5–86° C.

*Analysis.*—Calcd. for $C_{16}H_{26}N_4O_4$: N, 16.56. Found: N, 16.79.

Example 11

3,6-bis[2-(2-diethylaminoethoxy)ethoxy]pyridazine was obtained by the reaction of 3,6-dichloropyridazine with sodium 2-(diethylaminoethoxy)ethoxide using the manipulative procedure described above in Example 1. Fractionation of the crude product gave two compounds, 3-chloro-6-[2-(2-diethylaminoethoxy)ethoxy]pyridazine in 38% yield as a yellow oil, B. P. about 135° C. ($5.5\times10^{-5}$ mm.), $n_D^{25}$=1.5042; and 3,6-bis[2-(2-diethylaminoethoxy)ethoxy]pyridazine in 19.5% yield as a yellow oil, B. P. about 175° C. ($1\times10^{-5}$ mm.), $n_D^{25}$=1.4890.

The oxalate of 3-chloro-6-[2-(2-diethylaminoethoxy)ethoxy]pyridazine was prepared from the free base and oxalic acid in ethanol solution. The oxalate was recrystallized from an ethanol-pentane mixture, giving colorless microcrystals, M. P. 91.5–92.5° C.

*Analysis.*—Calcd for $C_{12}H_{20}ClN_3O_2 \cdot H_2C_2O_4$: N, 11.55; $H_2C_2O_4$, 24.75. Found: N, 11.56; $H_2C_2O_4$, 25.10.

Example 12

3,6-bis(2-diethylaminoethylmercapto)pyridazine was prepared from 3,6-dichloropyridazine and sodium 2-diethylaminoethylmercaptide in xylene using the manipulative procedure described above in Example 1. The 3,6-bis(2-diethylaminoethylmercapto)pyridazine was obtained in 69% yield as a yellow oil, B. P. 165–167° C. (0.07 mm.), which readily solidified and was recrystallized from pentane to give yellowish blades, M. P. 52–53° C.

*Analysis.*—Calcd. for $C_{16}H_{30}N_4S_2$: C, 56.10; H, 8.83; N, 16.36; S, 18.72. Found: C, 56.16; H, 8.80; N, 16.08; S, 18.66.

The bismethobromide of 3,6-bis(2-diethylaminoethylmercapto)pyridazine was prepared by warming the free base with an excess of methyl bromide in isopropyl alcohol. The bismethobromide was recrystallized from isopropyl alcohol and ether as creamy microcrystals, M. P. 205–206° C. (dec.).

*Analysis.*—Calcd. for $C_{18}H_{36}Br_2N_4S_2$: N, 10.52; Br, 30.02. Found: N, 10.65; Br, 29.52.

The curare-like activity of 3,6-bis(2-diethylaminoethylmercapto)pyridazine bismethobromide was measured in mice by the inclined screen procedure, and an $ED_{50}$ value of 1.5±0.15 mg./kg. was found. The approximate intravenous toxicity $LD_{50}$ value in mice was 1.8 mg./kg.

*Example 13*

3,6-bis(3-diethylaminopropylmercapto)pyridazine was prepared from 3,6-dichloropyridazine and sodium 3-diethylaminopropylmercaptide using the manipulative procedure described above in Example 1. 3,6-bis(3-diethylaminopropylmercapto)pyridazine was obtained in 71% yield as an amber oil, B. P. about 140° C. (2.6×10⁻⁵ mm.), $n_D^{25}=1.5486$.

*Analysis.*—Calcd. for $C_{18}H_{34}N_4S_2$: C, 58.33; H, 9.25; N, 15.12. Found: C, 58.49; H, 9.53; N, 15.10.

The bismethobromide of 3,6-bis(3-diethylaminopropylmercapto)pyridazine was prepared by warming the free base and an excess of methyl bromide in methanol solution. The bismethobromide was recrystallized from an ethanol-ether mixture, giving pale yellow microcrystals, M. P. 184–184.5° C.

*Analysis.*—Calcd. for $C_{20}H_{40}Br_2N_4S_2$: N, 9.99; Br, 28.52. Found: N, 10.20; Br, 28.02.

The curare-like activity of 3,6-bis(3-diethylaminopropylmercapto)pyridazine bismethobromide was measured in mice by the inclined screen procedure and rabbits by the head-drop method, and $ED_{50}$ values of 0.5±0.03 and 0.21 mg./kg. respectively were found. The approximate intravenous toxicity $LD_{50}$ value in mice was 0.84 mg./kg.

The bis(4-nitrobenzobromide) salt of 3,6-bis(3-diethylaminopropylmercapto)pyridazine was obtained in the form of rusty-colored microcrystals, M. P. 205° C. (dec.), when recrystallized from ethanol.

*Analysis.*—Calcd. for $C_{32}H_{46}Br_2N_6O_4S_2$: Br, 19.91; S, 7.99. Found: Br, 19.89; S, 8.20.

The curare-like activity of 3,6-bis(3-diethylaminopropylmercapto)pyridazine bis (4 - nitrobenzobromide) was measured in mice by the inclined screen procedure, and an $ED_{50}$ value of 0.46±0.05 mg./kg. was found.

*Example 14*

3,6-bis(4 - diethylaminobutylmercapto)-4-methylpyridazine was prepared from 3,6-dichloro-4-methylpyridazine and potassium 4-diethylaminobutylmercaptide using the manipulative procedure described above in Example 1. The 3,6-bis(4- - diethylaminobutylmercapto)-4-methylpyridazine was obtained in 76% yield as a yellow oil, B. P. about 175° C. (1×10⁻⁴ mm.), $n_D^{25}=1.5493$.

*Analysis.*—Calcd. for $C_{21}H_{40}N_4S_2$: C, 61.12; H, 9.77; S, 15.54. Found: C, 61.12; H, 9.45; S, 15.23.

The dioxalate of 3,6-bis(4-diethylaminobutylmercapto)-4-methylpyridazine was prepared from the free base and oxalic acid in ethyl acetate solution. The dioxalate was recrystallized from methanol as bright yellow needlets, M. P. 181–183° C. (dec.).

*Analysis.*—Calcd. for $C_{21}H_{40}N_4S_2 \cdot 2H_2C_2O_4$: N (basic nitrogen), 4.73; S, 10.82. Found: N (basic nitrogen), 4.79; S, 10.99.

*Example 15*

3-(3-diethylaminopropylamino)-6-(3 - diethylaminopropoxy)pyridazine.—A solution of 14.9 g. (0.1 mole) of 3,6-dichloropyridazine in 30 cc. of acetone was mixed with 39.2 g. (0.3 mole) of 3-diethylaminopropylamine in 50 cc. of water, and 2 cc. of concentrated hydrochloric acid was added. The mixture was stirred and refluxed for twenty-four hours, excess concentrated hydrochloric acid was added, and the solvents were removed in vacuo. The residue was made basic with 35% sodium hydroxide solution, and the product was extracted with methylene chloride. The methylene chloride extracts were concentrated, and the residue was steam distilled to remove excess 3-diethylaminopropylamine. This residue was extracted with methylene chloride, the solution dried over anhydrous sodium sulfate, and the product fractionated, giving an 88.5% yield of 6-chloro-3-(3-diethylaminopropylamino)pyridazine, B. P. about 130° C. (5×10⁻⁵ mm.). The distillate was crystallized from hexane to give the compound as colorless blades, M. P. 87–87.5° C.

*Analysis.*—Calcd. for $C_{11}H_{19}ClN_4$: Cl, 14.61; N, 23.08. Found: Cl, 14.89; N, 23.32.

The dihydrochloride of 6-chloro-3-(3-diethylaminopropylamino)pyridazine was prepared from the free base and hydrogen chloride in methanol solution. The dihydrochloride was recrystallized from an ethanol-ether mixture as colorless microcrystalline solid, M. P. 223–224° C.

*Analysis.*—Calcd. for $C_{11}H_{19}ClN_4 \cdot 2HCl$: N, 17.75; Cl, 22.46. Found: N, 17.60; Cl, 22.51.

The sodium salt of 3-diethylaminopropanol was prepared by adding 7.8 g. (0.06 mole) of the alcohol to a suspension of 1.27 g. (0.06 mole) of finely divided sodium in 105 cc. of xylene, and refluxing the mixture for four hours. To the mixture was added 12.1 g. (0.05 mole) of 6 - (3 - diethylaminopropylamino) - 3 - chloropyridazine, prepared as described above, dissolved in 75 cc. of xylene. The mixture was refluxed with stirring for ten hours and worked up using the manipulative procedure described above in Example 1. In this way a 40.5% yield of 3-(3-diethylaminopropylamino) - 6 - (3 - diethylaminopropoxy)pyridazine was obtained as a viscous, yellow oil, B. P. about 175° C. (1.8×10⁻⁵ mm.), $n_D^{25}=1.5118$.

*Analysis.*—Calcd. for $C_{18}H_{35}N_5O$: C, 64.05; H, 10.45; N, 20.75. Found: C, 64.0; H, 10.28; N, 20.74.

*Example 16*

3,6 - bis(3 - dimethylaminopropoxy)pyradazine was prepared from 3,6-dichloropyridazine and sodium 3-dimethylaminopropoxide according to the manipulative procedure described above in Example 1. The 3,6-bis(3-dimethylaminopropoxy)pyridazine was obtained in 61% yield in the form of prismatic needles, M. P. 37.5–38° C., when recrystallized from ether.

*Analysis.*—Calcd. for $C_{14}H_{26}N_4O_2$: C, 59.54; H, 9.28; N (basic), 14.88. Found: C, 59.96; H, 8.87; N (basic), 14.44.

The dihydrochloride salt of 3,6-bis(3-dimethylaminopropoxy)pyridazine was obtained in the form of colorless blades, M. P. 222–223° C., when recrystallized from acetone.

*Analysis.*—Calcd. for $C_{14}H_{26}N_4O_2 \cdot 2HCl$: C, 47.32; H, 7.94; Cl, 19.96. Found: C, 47.14; H, 7.68; Cl, 20.24.

The bismethobromide salt of 3,6-bis(3-dimethylaminopropoxy)pyridazine was obtained in the form of colorless needles, M. P. 240–241° C., when recrystallized from a methanol-acetone mixture.

*Analysis.*—Calcd. for $C_{16}H_{32}Br_2N_4O_2$: Br, 33.84; N (basic), 8.90. Found: Br, 33.54; N (basic), 8.90.

The curare-like activity of 3,6-bis(3-dimethylaminopropoxy)pyridazine bismethobromide was measured in mice by the inclined screen procedure, and an $ED_{50}$ value of 0.6±0.1 mg./kg. was found. The intravenous toxicity $LD_{50}$ value in mice was 1.0±0.16 mg./kg.

The bis(4-nitrobenzobromide) salt of 3,6-bis(3-dimethylaminopropoxy)pyridazine was obtained in the form of colorless prisms, M. P. 190–192° C., when recrystallized from a methanol-acetone mixture.

Analysis.—Calcd. for $C_{28}H_{38}Br_2N_6O_6$: C, 47.07; H, 5.36; Br, 22.37. Found: C, 47.26; H, 5.03; Br, 22.20.

The curare-like activity of 3,6-bis(3-dimethylaminopropoxy)pyridazine bis(4-nitrobenzobromide) was measured in mice by the inclined screen procedure, and an $ED_{50}$ value of $0.3 \pm 0.05$ mg./kg. was found. The intravenous toxicity $LD_{50}$ value in mice was $0.46 \pm 0.02$ mg./kg.

Example 17

3,6 - bis(2 - dimethylamino - 1 - methylethoxy)pyridazine was prepared from 3,6-dichloropyridazine and sodium 2-dimethylamino-1-methylethoxide according to the manipulative procedure described above in Example 1. The 3,6-bis(2-dimethylamino-1-methylethoxy)-pyridazine was obtained in 84% yield as a pale yellow oil, B. P. 84–89° C. (0.001 mm.), $n_D^{25} = 1.4879$.

Analysis.—Calcd. for $C_{14}H_{26}N_4O_2$: C, 59.54; H, 9.28; N, 19.84. Found: C, 59.66; H, 9.28; N, 20.03.

The bismethiodide salt of 3,6-bis(2-dimethylamino-1-methylethoxy)pyridazine was obtained in the form of colorless needles, M. P. 198.5–200.5° C. (dec.), when recrystallized from a methanol-acetone mixture.

Analysis.—Calcd. for $C_{16}H_{32}I_2N_4O_2$: I, 44.8; N (basic), 7.42. Found: I, 44.4; N (basic), 7.25.

The curare-like activity of 3,6-bis(2-dimethylamino-1-methylethoxy) pyridazine bismethiodide was measured in mice by the inclined screen procedure, and an $ED_{50}$ value of $7.9 \pm 0.58$ mg./kg. was found. The approximate intravenous toxicity $LD_{50}$ value in mice was 12 mg./kg.

Example 18

3,6 - bis(3 - dimethylaminopropoxy) - 4,5 - dimethylpyridazine was prepared from 3,6-dichloro-4,5-dimethylpyridazine and sodium 3-dimethylaminopropoxide, according to the manipulative procedure described above in Example 1. The 3,6-bis(3-dimethylaminopropoxy)-4,5-dimethylpyridazine was obtained in 66% yield as a pale yellow oil, B. P. 120–122° C. (0.0005 mm.), $n_D^{25} = 1.4970$.

Analysis.—Calcd. for $C_{16}H_{30}N_4O_2$: C, 61.90; H, 9.74; N (basic), 13.54. Found: C, 61.60; H, 9.22; N (basic), 13.07.

The dihydrochloride salt of 3,6-bis(3-dimethylaminopropoxy) - 4,5 - dimethylpyridazine was obtained in the form of colorless felted needles, M. P. 250.5–251.5° C., when recrystallized from a methanol-acetone mixture.

Analysis.—Calcd. for $C_{16}H_{30}N_4O_2 \cdot 2HCl$: C, 50.12; H, 8.42; Cl, 18.50. Found: C, 50.18; H, 8.45; Cl, 18.42.

The bis(4 - nitrobenzobromide) salt of 3,6 - bis(3-dimethylaminopropoxy) - 4,5 - dimethylpyridazine was obtained in the form of colorless warty aggregates, M. P. 207–208° C. (dec.), when recrystallized from a methanol-ethanol mixture.

Analysis.—Calcd. for $C_{30}H_{42}Br_2N_6O_6$: C, 48.52; H, 5.70; Br. 21.53. Found: C, 48.62; H, 5.59; Br, 21.80.

The curare-like activity of 3,6-bis(3-dimethylaminopropoxy) - 4,5 - dimethylpyridazine bis(4 - nitrobenzobromide) was measured in mice by the inclined screen procedure, and an $ED_{50}$ value of $0.46 \pm 0.04$ mg./kg. was found. The approximate intravenous toxicity $LD_{50}$ value in mice was 1 mg./kg.

Example 19

3,6 - bis(3 - dimethylaminopropoxy) - 4 - methylpyridazine was prepared from 3,6-dichloro-4-methylpyridazine and sodium 3-dimethylaminopropoxide according to the manipulative procedure described above in Example 1. The 3,6 - bis(3 - dimethylaminopropoxy) - 4 - methylpyridazine was obtained in 73% yield as a pale yellow oil, B. P. 114–116° C. (0.0005 mm.), $n_D^{25} = 1.4972$.

Analysis.—Calcd. for $C_{15}H_{28}N_4O_2$: C, 60.78; H, 9.52; N (basic), 14.19. Found: C, 60.49; H, 9.22; N (basic), 13.65.

The triphosphate salt of 3,6-bis(3-dimethylaminopropoxy)-4-methylpyridazine was obtained in the form of colorless microcrystals, M. P. 155–156.5° C., when recrystallized from methanol.

Analysis.—Calcd. for $C_{15}H_{28}N_4O_2 \cdot 3H_3PO_4$: $H_3PO_4$, 49.81; N, 9.49. Found: $H_3PO_4$, 50.0; N, 9.56.

The bis(4-nitrobenzobromide) salt of 3,6-bis(3-dimethylaminopropoxy)-4-methylpyridazine was obtained in the form of colorless blades, M. P. 191–192° C., when recrystallized from a methanol-ethanol mixture.

Analysis.—Calcd. for $C_{29}H_{40}Br_2N_6O_6$: C, 47.81; H, 5.54; Br, 21.94. Found: C, 47.46; H, 5.42; Br, 21.60.

The curare-like activity of 3,6-bis(3-dimethylaminopropoxy)-4-methylpyridazine bis(4-nitrobenzobromide) was measured in mice by the inclined screen procedure, and an $ED_{50}$ value of $0.47 + 0.03$ mg./kg. was found. The approximate intravenous toxicity $LD_{50}$ value in mice was 1 mg./kg.

Example 20

3,6 - bis(3 - dimethylamino - 1 - methylpropoxy pyridazine was prepared from 3,6-dichloropyridazine and sodium 3-dimethylamino-1-methylpropoxide according to the manipulative procedure described above in Example 1. The 3,6-bis(3-dimethylamino-1-methylpropoxy)pyridazine was obtained in 72% yield as a straw-colored oil, B. P. 80–84° C. (0.00045 mm.), $n_D^{25} = 1.4930$.

Analysis.—Calcd. for $C_{16}H_{30}N_4O_2$: C, 61.90; H, 9.74; N, 18.05. Found: C, 61.72; H, 9.78; N, 18.37.

The bismethobromide salt of 3,6-bis(3-dimethylamino-1-methylpropoxy)pyridazine was obtained in the form of colorless microcrystals, M. P. 210° C. (dec.), when recrystallized from an ethanol-ether mixture.

Analysis.—Calcd. for $C_{18}H_{36}Br_2N_4O_2$: Br, 31.95; O, 6.40. Found: Br, 31.99; O, 6.40.

The curare-like activity of 3,6-bis(3-dimethylamino-1-methylpropoxy)pyridazine bismethobromide was measured in mice by the inclined screen procedure, and an $ED_{50}$ value of $0.36 + 0.02$ mg./kg. was found. The approximate intravenous toxicity $LD_{50}$ value in mice was 1.1 mg./kg.

Example 21

3,6 - bis[2 - (1 - methyl - 2 - piperidyl)ethoxy]pyridazine was prepared from 3,6-dichloropyridazine and sodium 2-(1-methyl-2-piperidyl)-ethoxide according to the manipulative procedure described above in Example 1. The 3,6-bis[2-(1-methyl-2-piperidyl)ethoxy]-pyridazine was obtained in 87% yield as a pale yellow oil, B. P. 175–177° C. (0.0003 mm.), $n_D^{25} = 1.5228$.

Analysis.—Calcd. for $C_{20}H_{34}N_4O_2$: C, 66.26; H, 9.45; N, 15.46. Found: C, 65.96; H, 9.25; N, 15.60.

The bismethobromide salt of 3,6-bis[2-(1-methyl-2-piperidyl)ethoxy]pyridazine was obtained in the form of colorless microcrystals, M. P. 140–142° C., when recrystallized from a methanol-acetone mixture.

Analysis.—Calcd. for $C_{22}H_{40}Br_2N_4O_2$: C, 47.83; H, 7.30; Br, 28.94. Found: C, 47.46; H, 7.16; Br, 28.90.

The curare-like activity of 3,6-bis[2-(1-methyl-2-piperidyl)ethoxy]pyridazine bismethobromide was measured in mice by the inclined screen procedure, and an $ED_{50}$ value of $0.54 + 0.13$ mg./kg. was found. The approximate intravenous toxicity $LD_{50}$ value in mice was 0.95 mg./kg.

Example 22

3,6 - bis[3 - (4 - methyl - 1 - piperazinyl)propoxy]pyridazine was prepared from 3,6-dichloropyridazine and sodium 3-(4-methyl-1-piperazinyl)-propoxide according to the manipulative procedure described above in Example 1. The 3,6-bis[3-(4-methyl-1-piperazinyl)propoxy]-pyridazine was obtained in 70% yield in the form of colorless blades, M. P. 99.5–100° C., when recrystallized from a pentanehexane mixture.

Analysis.—Calcd. $C_{20}H_3 N_6O_2$: C, 61.62, H, 8.92; N (basic), 14.25. Found: C, 61.40; H. 9.25; N (basic), 14.30.

The tetrahydrochloride salt of 3,6-bis[3-(4-methyl-1-piperazinyl)propoxy]pyridazine was obtained in the form of colorless microcrystals, M. P. 222–224° C., when recrystallized from a methanol-ether mixture.

*Analysis.*—Calcd. for $C_{20}H_{36}N_6O_2 \cdot 4HCl$: C, 44.61; H, 7.49; Cl, 26.34. Found: C, 44.33; H, 7.26; Cl. 26.50.

Example 23

3,6-bis[2-(4-methyl-1-piperazinyl)ethoxy]pyridazine was prepared from 3,6-dichloropyridazine and sodium 2-(4-methyl-1-piperazinyl)-ethoxide according to the manipulative procedure described above in Example 1. The 3,6-bis[2-(4-methyl-1-piperazinyl)ethoxy]-pyridazine was obtained in 66.5% yield in the form of colorless plates, M. P. 116–117° C., when recrystallized from pentane.

The tetrahydrochloride salt of 3,6-bis[2-(4-methyl-1-piperazinyl)ethoxy]pyridazine was obtained in the form of colorless microcrystals, M. P. 192–193° C. (dec.), when recrystallized from a methanol-ether mixture.

*Analysis.*—Calcd. for $C_{18}H_{32}N_6O_2 \cdot 4HCl$: Cl, 27.79; N, 16.47. Found: Cl. 27.53; N, 16.40.

Example 24

3,6-bis[3-(1-piperidyl)propoxy]pyridazine was prepared from 3,6-dichloropyridazine and sodium 3-(1-piperidyl)propoxide according to the manipulative procedure described above in Example 1. The 3,6-bis[3-(1-piperidyl)propoxy]pyridazine was obtained in 70% yield as colorless needles, M. P. 70–72° C.

The bismethiodide salt of 3,6-bis[3-(1-piperidyl)-propoxy]pyridazine was made by dissolving the free base in a large excess of methyl iodide, and warming the solution momentarily on a steam bath. The gummy product was separated and stirred with warm acetone, and the crystalline material thus formed was collected by filtration and recrystallized three times from a methanol-acetone mixture, giving the bismethiodide salt of 3,6-bis[3-(1-piperidyl)propoxy]pyridazine, ivory needles, M. P. 196–198° C.

According to the methods described in the above examples, the following compounds can be prepared: 3,6-bis(3-dimethylamino-1-methylpropoxy)pyridazine [from 3,6-dichloropyridazine and sodium 3-dimethylamino-1-methylpropoxide]; 6-(4-diethylaminobutoxy)-3-(3-diethylaminopropylmercapto)pyridazine [from 3-chloro-6-(4-diethylaminobutoxy)pyridazine (Example 7) and sodium 3-diethylaminopropylmercaptide]; 1,6-bis(2-dimethylamino-ethoxy)-4-butylpyridazine [from 3,6-dichloro-4-butylpyridazine and sodium 2-dimethylaminoethoxide]; 6-(3-dimethylaminopropylmercapto)-3-(3-diethylaminopropylamino)pyridazine [from 6-chloro-3-(3-diethylaminopropylamino)pyridazine (Example 14) and sodium 3-dimethylaminopropylmercaptide]; 3,6-bis[2-(1-piperidyl)ethoxy]-pyridazine [from 3,6-dibromopyridazine and sodium 2-(1-piperidyl)-ethoxide]; 3,6-bis[3-(1-pyrrolidyl)propylmercapto]pyridazine [from 3,6-dichloropyridazine and sodium 3-(1-pyrrolidyl)propylmercaptide]; 3,6-bis[4-(4-morpholinyl)butoxy]pyridazine [from 3,6-dichloropyridazine and sodium 4-(4-morpholinyl)butoxide]; 3,6-bis(2-diethylaminopropoxy)-4,5-dimethylpyridazine [from 3,6-dichloro-4,5-dimethylpyridazine and sodium 2-diethylaminoethoxide]; and the like.

3,6-bis(2-diethylaminopropoxy)pyridazine reacts with methyl chloride, methyl bromide, ethyl chloride, ethyl bromide, ethyl iodide, propyl bromide, butyl chloride, isopropyl chloride, hexyl bromide, allyl bromide, methyl sulfate, benzyl chloride, p-nitrobenzyl bromide, o-chlorobenzyl chloride, or m-methoxybenzyl chloride to form the following quaternary ammonium salts, respectively: bismethochloride, bismethobromide, bisethochloride, bisethobromide, bisethiodide, bispropobromide, bisbutochloride, bisisopropochloride, bishexobromide, bisallobromide, bismethosulfate, bisbenzochloride, bis(p-nitrobenzobromide), bis(o-chlorobenzochloride) or bis(m-methoxybenzochloride). The methohalides, benzohalides and substituted benzohalides (halide meaning chloride, bromide or iodide) are preferred types.

Referring to the general structural formula near the beginning of this specification, optimum curarimimetic activity appears to be reached in the compounds of my invention where the sum of the number of carbon atoms separating Z and Y and the number of carbon atoms separating Y' and Z' is about six. The most readily available species of this class are those where A and A' are 1,3-propylene, $—CH_2CH_2CH_2—$, groups, including 3,6-bis(3-di-lower-alkylaminopropoxy)pyridazines, 3,6-bis(3-di-lower-alkylaminopropylmercapto)pyridazines, and acid-addition and quaternary ammonium salts thereof, and these represent a particularly preferred selected group.

I claim:

1. A member of the group consisting of (A) 3,6-bis(tertiary-amino-aliphatic) substituted pyridazines, (B) therapeutically acceptable acid-addition salts thereof, and (C) a member of the group consisting of therapeutically acceptable lower-alkyl, lower-alkenyl and lower-aralkyl quaternary ammonium salts thereof, said pyridazines having the formula

wherein Z and Z' are tertiary-amino groups selected from the group consisting of di-lower-alkylamino, piperidyl, pyrrolidyl, morpholinyl, and piperazinyl radicals, and lower-alkylated derivatives thereof, A and A' are members of the group consisting of lower-alkylene radicals and oxygen interrupted lower-alkylene radicals, Y is a member of the group consisting of O, S and NH, Y' is a member of the group consisting of O and S, $R^1$ and $R^2$ are members of the group consisting of hydrogen and lower-alkyl radicals, and Z and Z' are separated from Y and Y' respectively by at least two carbon atoms.

2. A member of the group consisting of therapeutically acceptable lower-alkyl, lower-alkenyl and lower-aralkyl quaternary ammonium salts of a 3,6-bis(tertiary-aminoalkyl) substituted pyridazine having the formula

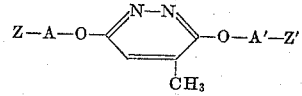

wherein Z and Z' are di-lower-alkylamino radicals, A and A' are lower-alkylene radicals, and Z and Z' are separated from the oxygen atoms by at least two carbon atoms.

3. A member of the group consisting of therapeutically acceptable lower-alkyl, lower-alkenyl and lower-aralkyl quaternary ammonium salts of a 3,6-bis(tertiary-aminoalkyl) substituted pyridazine having the formula

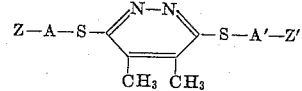

wherein Z and Z' are di-lower-alkylamino radicals, A and A' are lower-alkylene radicals, and Z and Z' are separated from the sulfur atoms by at least two carbon atoms.

4. A member of the group consisting of therapeutically acceptable lower-alkyl, lower-alkenyl and lower-aralkyl quaternary ammonium salts of a 3,6-bis(tertiary-aminoalkyl) substituted pyridazine having the formula

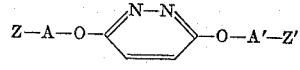

wherein Z and Z' are di-lower-alkylamino radicals, A and A' are lower-alkylene radicals, and Z and Z' are separated from the oxygen atoms by at least two carbon atoms.

5. A member of the group consisting of therapeutically acceptable lower-alkyl, lower-alkenyl and lower-aralkyl quaternary ammonium salts of a 3,6-bis(tertiary-aminoalkyl) substituted pyridazine having the formula

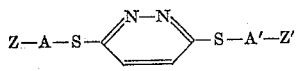

wherein Z and Z' are di-lower-alkylamino radicals, A and A' are lower-alkylene radicals, and Z and Z' are separated from the sulfur atoms by at least two carbon atoms.

6. A member of the group consisting of therapeutically acceptable lower-alkyl, lower-alkenyl and lower-aralkyl quaternary ammonium salts of 3,6-bis(3-di-lower-alkyl-aminopropoxy)-4-methylpyridazines.

7. A member of the group consisting of therapeutically acceptable lower-alkyl, lower-alkenyl and lower-aralkyl quaternary ammonium salts of 3,6-bis(3-di-lower-alkyl-aminopropylmercapto)-4,5-dimethylpyridazines.

8. A member of the group consisting of therapeutically acceptable lower-alkyl, lower-alkenyl and lower-aralkyl quaternary ammonium salts of 3,6-bis(3-di-lower-alkyl-aminopropoxy)pyridazines.

9. A member of the group consisting of therapeutically acceptable lower-alkyl, lower-alkenyl and lower-aralkyl quaternary ammonium salts of 3,6-bis(3-di-lower-alkyl-aminopropylmercapto)pyridazines.

10. A member of the group consisting of therapeutically acceptable lower-alkyl, lower-alkenyl and lower-aralkyl quaternary ammonium salts of 3,6-bis(3-diethyl-aminopropoxy)pyridazine.

11. A member of the group consisting of therapeutically acceptable lower-alkyl, lower-alkenyl and lower-aralkyl quaternary ammonium salts of 3,6-bis(3-diethyl-aminopropylmercapto)pyridazine.

12. A member of the group consisting of therapeutically acceptable lower-alkyl, lower-alkenyl and lower-aralkyl quaternary ammonium salts of 3,6-bis(3-diethyl-aminopropoxy)-4-methylpyridazine.

13. 3,6 - bis(3 - diethylaminopropoxy)pyridazine bismethohalide.

14. 3,6 - bis(2-diethylaminopropylmercapto)pyridazine bismethohalide.

15. 3,6 - bis(3-diethylaminopropoxy)-4-methylpyridazine bis(4-nitrobenzohalide).

16. A member of the group consisting of therapeutically acceptable lower-alkyl, lower-alkenyl and lower-aralkyl quaternary ammonium salts of 3,6-bis(3-dimethyl-aminopropoxy)-4-methylpyridazine.

17. A member of the group consisting of therapeutically acceptable lower-alkyl, lower-alkenyl and lower-aralkyl quaternary ammonium salts of 3,6-bis(3-dimethyl-aminopropoxy)-4,5-dimethylpyridazine.

18. 3,6-bis(3-dimethylaminopropoxy)-4-methylpyridazine bis(4-nitrobenzohalide).

19. 3,6 - bis(3 - dimethylaminopropoxy)-4,5-dimethyl-pyridazine bis(4-nitrobenzohalide).

20. The process for preparing a compound having the formula

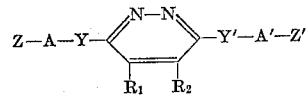

wherein Z and Z' are tertiary-amino groups selected from the group consisting of di-lower-alkylamino, piperidyl, pyrrolidyl, morpholinyl, and piperazinyl radicals, and lower-alkylated derivatives thereof, A and A' are members of the group consisting of lower-alkylene radicals and oxygen interrupted lower-alkylene radicals, Y is a member of the group consisting of O, S and NH, Y' is a member of the group consisting of O and S, $R^1$ and $R^2$ are members of the group consisting of hydrogen and lower-alkyl radicals, and Z and Z' are separated from Y and Y' respectively by at least two carbon atoms, which comprises reacting a 3,6-dihalopyridazine having the formula

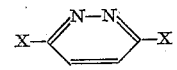

wherein X is a halogen atom having an atomic weight between 35 and 80, with a member of the group consisting of Z—A—OM, Z—A—SM, and Z—A—NH$_2$, where M is an alkali metal, and reacting the resulting compound of the formula

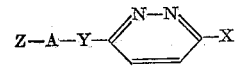

with a compound having the formula MY'—A'—Z'.

21. The process for preparing a compound having the formula

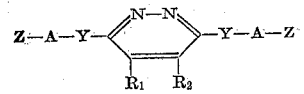

wherein Z is a di-lower-alkylamino radical, A is a lower-alkylene radical, Y is O, $R^1$ and $R^2$ are hydrogen atoms, and Z and Y are separated by at least two carbon atoms, which comprises heating a compound having the formula

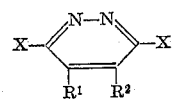

wherein X is a halogen atom having an atomic weight between 35 and 80, with a compound having the formula Z—A—Y—M, where M is an alkali metal, in an inert organic solvent under anhydrous conditions.

22. A 3-halo-6-tertiary-amino-aliphatic substituted pyridazine having the formula

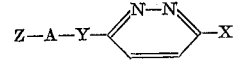

wherein Z is a tertiary-amino group selected from the group consisting of di-lower-alkylamino, piperidyl, pyrrolidyl, morpholinyl, and piperazinyl radicals, and lower-alkylated derivatives thereof, A is a member of the group consisting of lower-alkylene radicals and oxygen interrupted lower-alkylene radicals, Y is a member of the group consisting of O, S and NH, X is a halogen atom having an atomic weight between 35 and 80, and Z and Y are separated by at least two carbon atoms.

23. A 3 - halo - 6-(di-lower-alkylamino-lower-alkoxy)-pyridazine having the formula

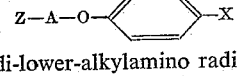

wherein Z is a di-lower-alkylamino radical, A is a lower-alkylene radical, and X is a halogen atom having an atomic weight between 35 and 80.

24. A 3 - halo-6-(di-lower-alkylamino-lower-alkylmercapto)pyridazine having the formula

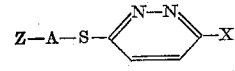

wherein Z is a di-lower-alkylamino radical, A is a lower-alkylene radical, and X is a halogen atom having an atomic weight between 35 and 80.

25. A 3 - halo - 6 - (di-lower-alkylamino-lower-alkyl-amino)pyridazine having the formula

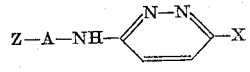

wherein Z is a di-lower-alkylamino radical, A is a lower-alkylene radical, and X is a halogen atom having an atomic weight between 35 and 80.

26. 3 - chloro - 6-(3-diethylaminopropylamino)pyridazine.

27. 3 - chloro - 6-[2-(2-diethylaminoethoxy)ethoxy]-pyridazine.

28. 3-chloro-6-(4-diethylaminobutoxy)pyridazine.

29. The process for preparing a 3,6-bis(3-di-lower-alkylaminopropoxy)pyridazine which comprises heating 3,6-dichloropyridazine with an alkali metal 3-di-lower-alkylaminopropoxide in an inert organic solvent under anhydrous conditions.

30. The process for preparing a 3,6-bis(3-diethylaminopropoxy)pyridazine which comprises heating 3,6-dichloropyridazine with an alkali metal 3-diethylaminopropoxide in an inert organic solvent under anhydrous conditions.

No references cited.

UNITED STATES PATENT OFFICE
Certificate of Correction

Patent No. 2,858,311

October 28, 1958

Edgar Alfred Steck

It is hereby certified that error appears in the printed specification of the above numbered patent requiring correction and that the said Letters Patent should read as corrected below.

Column 7, line 52, for "methanolacetone-" read — methanol-acetone- —; column 10, line 45, for ")pyradazine" read —)pyridazine—; column 12, line 14, for 0.47+0.03 mg./kg.   read   0.47±0.03 mg./kg.

line 18, for "-1-methylpropoxy pyrid-" read — -1-methylpropoxy)pyrid- —; line 36, for "0.36+0.02 mg./kg." read —0.36±0.02 mg./kg.—; line 59, for "0.54+0.13 mg./kg." read —0.54±0.13 mg./kg.—; line 70, for "pentanehexane" read —pentane-hexane—; line 71, for "$C_{20}H_3 N_6O_2$:" read —$C_{20}H_{36}N_6O_2$:—

Signed and sealed this 17th day of March 1959.

[SEAL]

Attest:
KARL H. AXLINE,
*Attesting Officer.*

ROBERT C. WATSON,
*Commissioner of Patents.*